(12) United States Patent
Zhang et al.

(10) Patent No.: US 12,535,928 B2
(45) Date of Patent: Jan. 27, 2026

(54) HANDWRITING ELECTRONIC DEVICE WITH PRINTING AND VARIOUS OTHER FUNCTIONS

(71) Applicant: Fushan Zhang, Heyuan (CN)

(72) Inventors: Fushan Zhang, Heyuan (CN); Shangying Deng, Shenzhen (CN)

(73) Assignee: Fushan Zhang, Heyuan (CN)

( * ) Notice: Subject to any disclaimer, the term of this patent is extended or adjusted under 35 U.S.C. 154(b) by 0 days.

(21) Appl. No.: 18/806,751

(22) Filed: Aug. 16, 2024

(65) Prior Publication Data

US 2025/0298486 A1   Sep. 25, 2025

(30) Foreign Application Priority Data

Mar. 22, 2024   (CN) .......................... 202410337177.4

(51) Int. Cl.
| | |
|---|---|
| *G09G 5/00* | (2006.01) |
| *G02F 1/1333* | (2006.01) |
| *G06F 3/0354* | (2013.01) |
| *G06F 3/046* | (2006.01) |
| *H04N 1/00* | (2006.01) |

(52) U.S. Cl.
CPC .......... *G06F 3/046* (2013.01); *G02F 1/13338* (2013.01); *G06F 3/03545* (2013.01); *H04N 1/00129* (2013.01)

(58) Field of Classification Search
CPC .. G06F 3/046; G06F 3/03545; G02F 1/13338; H04N 1/00129
USPC .......................................................... 345/174
See application file for complete search history.

(56) References Cited

U.S. PATENT DOCUMENTS

| | | | | |
|---|---|---|---|---|
| 2004/0195962 | A1* | 10/2004 | Nakamura | H10K 50/85 313/506 |
| 2013/0033429 | A1* | 2/2013 | Silverbrook | G06F 3/0483 345/173 |
| 2017/0090692 | A1* | 3/2017 | Kurita | G06F 40/166 |
| 2017/0285934 | A1* | 10/2017 | Wang | G06F 1/1662 |
| 2021/0096673 | A1* | 4/2021 | Pang | G06F 3/0416 |
| 2022/0011886 | A1* | 1/2022 | Choi | G06F 3/03545 |

* cited by examiner

*Primary Examiner* — Jennifer T Nguyen
(74) *Attorney, Agent, or Firm* — Jose Cherson Weissbrot

(57) ABSTRACT

The invention provides a handwriting electronic device with printing and various other functions, which comprises an electromagnetic pen and a handwriting pad. The electromagnetic pen is used for writing on the handwriting pad, the handwriting pad has at least one display panel, an electromagnetic induction antenna board, a printing mechanism and a control component, the display panel and the electromagnetic induction antenna board are arranged with one above the other, and the display panel, the electromagnetic induction antenna board and the printing mechanism are all electrically connected with the control component.

9 Claims, 8 Drawing Sheets

HANDWRITING ELECTRONIC DEVICE WITH PRINTING AND VARIOUS OTHER FUNCTIONS

CROSS REFERENCE TO RELATED APPLICATIONS

This application claims the priority of the Chinese patent application 202410337177.4 filed on Mar. 22, 2024, entitled "HANDWRITING DEVICE WITH PRINTING FUNCTION", and the entire content of the above application and its amendments are hereby incorporated by reference.

BACKGROUND OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

1. Technical Field

The present invention relates to the technical field of handwriting devices, in particular to a handwriting electronic device with printing and various other functions.

2. Description of Related Art

With the continuous development of science and technology, handwriting pads, as a convenient and practical tool, have been widely used in education, office and other fields. However, handwriting pads available in the market now have relatively limited functions, mainly limited to handwriting input.

For example, the existing US invention patent with publication number US20110100730A1 discloses a "HANDWRITING INPUT SYSTEM", which is limited to handwriting functionality only.

BRIEF SUMMARY OF THE INVENTION

The present invention provides a handwriting electronic device with printing and various other functions to address the problem of single functionality in existing handwriting pads mentioned in the background art.

To achieve the above objective, the invention adopts the following technical scheme.

The present invention provides a handwriting electronic device with printing and various other functions, which comprises an electromagnetic pen and a handwriting pad; the electromagnetic pen is used for writing on the handwriting pad;

the handwriting pad comprises at least one display panel, an electromagnetic induction antenna board, a printing mechanism and a control component, the display panel is spaced apart from the electromagnetic induction antenna board, and an imitation chamber is formed; the display panel, the electromagnetic induction antenna board and the printing mechanism are all electrically connected with the control component, the display panel is used to display a moving trajectory of the electromagnetic pen in the writing process, and the electromagnetic induction antenna board is used to detect the moving trajectory of the electromagnetic pen in the writing process; and the control component is able to acquire the trajectory information from the electromagnetic induction antenna board and control the printing mechanism to print the trajectory information on paper, and the control component is able to apply an erasing voltage to the display panel, and clear the trajectory information.

The present invention further provides a handwriting electronic device with printing and various other functions, which comprises a smart pen and a handwriting pad; the smart pen is used for writing on the handwriting pad;

the handwriting pad comprises at least a display panel, a printing mechanism and a control component;

the display panel comprises a semitransparent display film, and a surface of the display film not in contact with the smart pen is provided with an array of code points;

the smart pen comprises an optical sensing module for detecting a moving trajectory of the smart pen, and a processing unit for processing the moving trajectory of the smart pen; and the display panel is used to display the moving trajectory of the smart pen in the writing process, and the control component is able to obtain the trajectory information from the processing unit and control the printing mechanism to print the trajectory information on paper.

BRIEF DESCRIPTION OF THE SEVERAL VIEWS OF THE DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
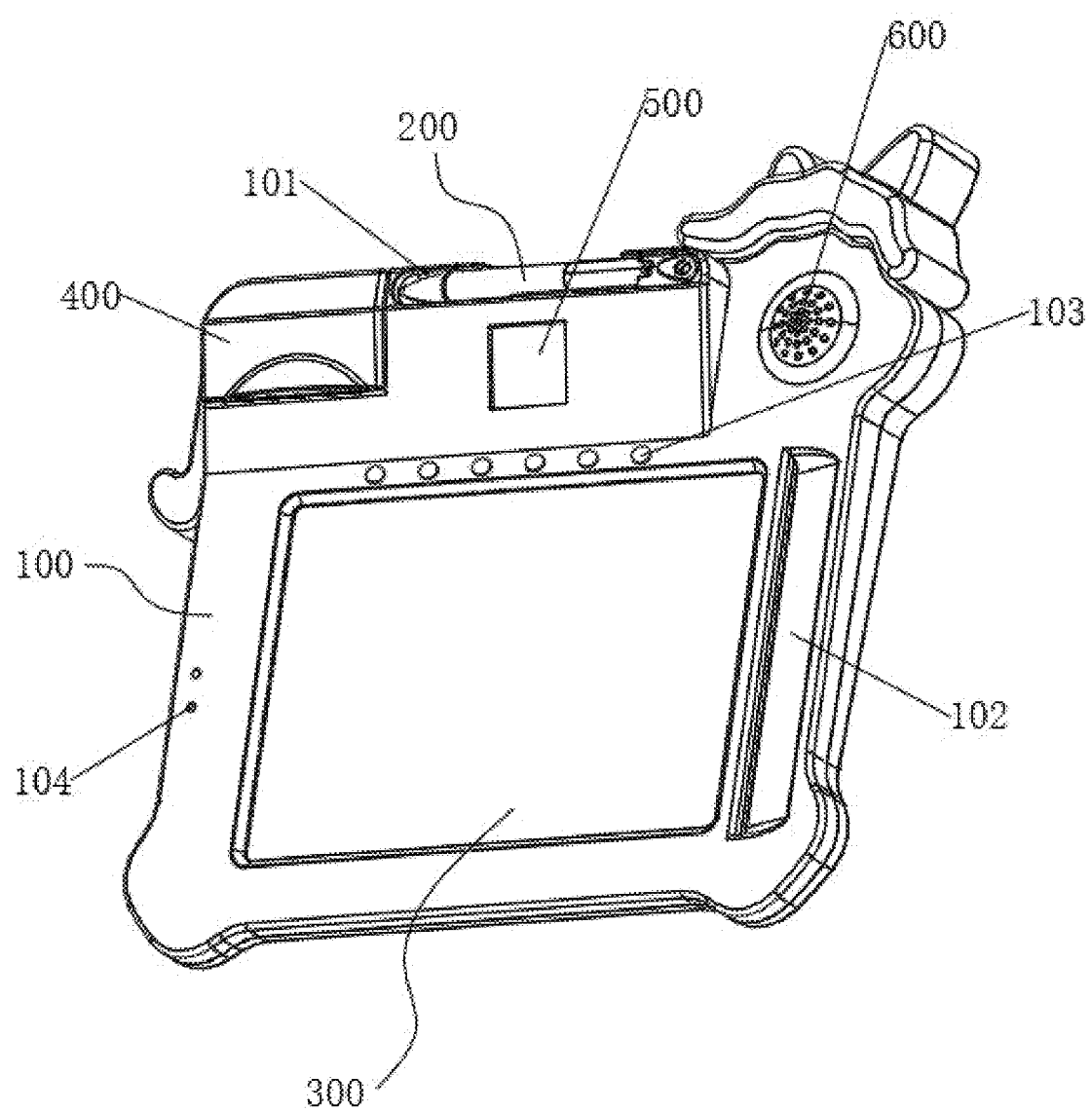
FIG. 1 is a structural diagram of the present invention.

In the drawings: handwriting pad (100); pen slot (101); insertion port (102); control button group (103); indicator lamp (104); interface (105); switch (106); imitation chamber (107); electromagnetic pen (200); pen case (201); pen point (202); electromagnetic wave emitter (203); display panel (300); display film (301); code point (115); support plate (302); printing mechanism (400); LCD screen (500); speaker (600); electromagnetic induction antenna board (700); luminous body (800); smart pen (900); inductive pen point (901); optical sensing module (902).

DETAILED DESCRIPTION OF THE INVENTION

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Embodiment 1

Refer to FIGS. 1-8.

The present invention provides a handwriting electronic device with printing and various other functions, which comprises an electromagnetic pen 200 and a handwriting pad 100.

The electromagnetic pen 200 is used for writing on the handwriting pad 100. It should be noted here that the electromagnetic pen 200 has basic functions and comprises a pen point 202, an electromagnetic wave emitter 203, and the like.

In this embodiment, at least one display panel 300, an electromagnetic induction antenna board 700, a printing mechanism 400 and a control component are integrated in the handwriting pad 100. Specifically, the display panel 300, the electromagnetic induction antenna board 700, the printing mechanism 400 and the control component are local structures of the handwriting pad 100.

In this embodiment, the display panel 300 is preferably a semitransparent nematic allyltributylstannane liquid crystal display panel or a cholesteric liquid crystal display panel. In other embodiments, the display panel 300 may also be a semitransparent cholesteric liquid crystal display panel or other nematic liquid crystal display panels.

Figure 8:
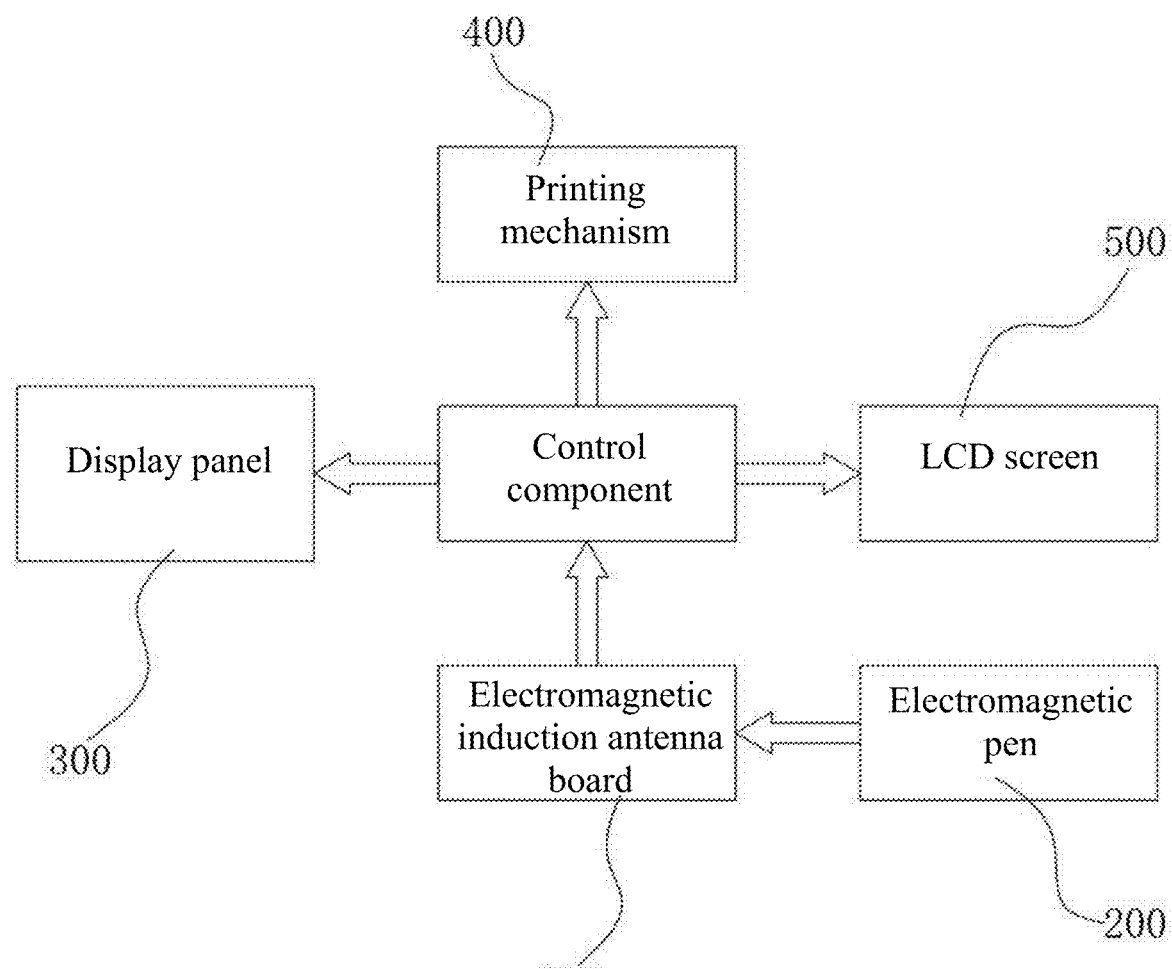
FIG. 8 is a schematic diagram of an embodiment of the present invention.

Based on the structural design of the present invention, the handwriting electronic device with printing and various other functions adds the printing function to the handwriting pad 100. Thus, during use, the handwriting pad 100 can not only display a moving trajectory by means of the display panel 300, but also print trajectory information corresponding to the moving trajectory on paper by means of a printer, as shown in FIG. 8, and writing on paper is allowed to realize the writing operation of the display panel 300, for example, adding colors by using colored pens. The handwriting electronic device with printing and various other functions greatly improves users' operation experience and fun through its diverse and rich usage modes, effectively preventing the fading of interest. It not only meets the needs of traditional handwriting but also, through innovative technology fusion, allows users to instantly transform handwritten content into physical text and images. The convenience of writing and printing at the same time greatly sparks users' creativity and exploration desire. Moreover, when applied in office settings, it enables concurrent writing and printing, thus enhancing work efficiency.

Specifically, the display panel 300 and the electromagnetic induction antenna board 700 are arranged with one above the other. The display panel 300, the electromagnetic induction antenna board 700 and the printing mechanism 400 are all electrically connected with the control component. The display panel 300 is used to display the moving trajectory of the electromagnetic pen 200 in the writing process. Here, the moving trajectory displayed by the display panel 300 can be directly seen by users, and the electromagnetic pen 200 can be used for writing, drawing, and more. The electromagnetic induction antenna board 700 is used to detect the moving trajectory of the electromagnetic pen 200 in the writing process. It should be noted here that the moving trajectory detected by the electromagnetic induction antenna board 700 is the same as the moving trajectory displayed by the display panel 300. The control component can acquire the trajectory information from the electromagnetic induction antenna board 700 and control the printing mechanism 400 to print the trajectory information on paper. The control component can apply an erasing voltage to the display panel 300, and can also clear the trajectory information, as shown in FIG. 8.

Figure 2:
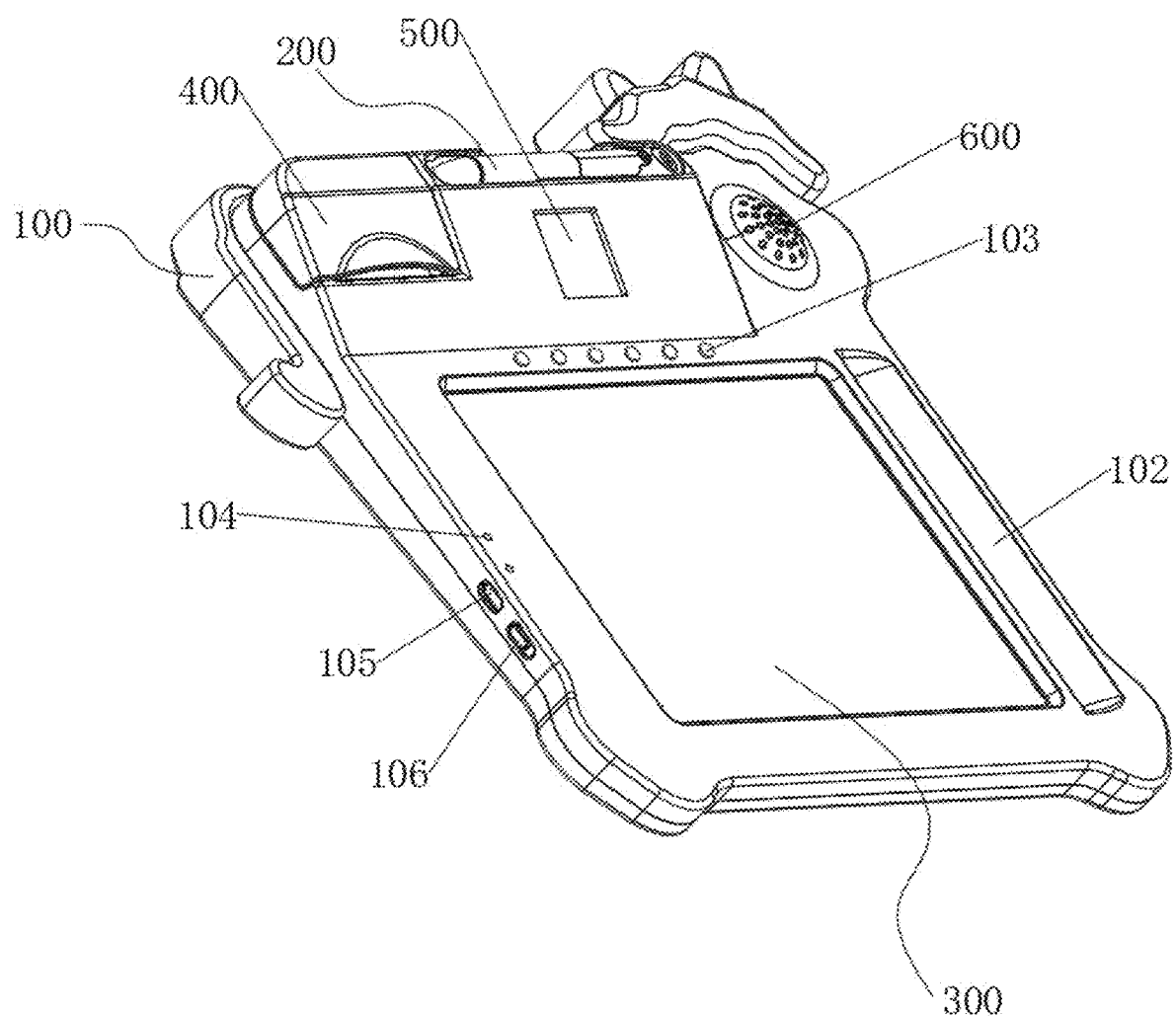
FIG. 2 is a structural diagram of the present invention from another angle.
Figure 3:
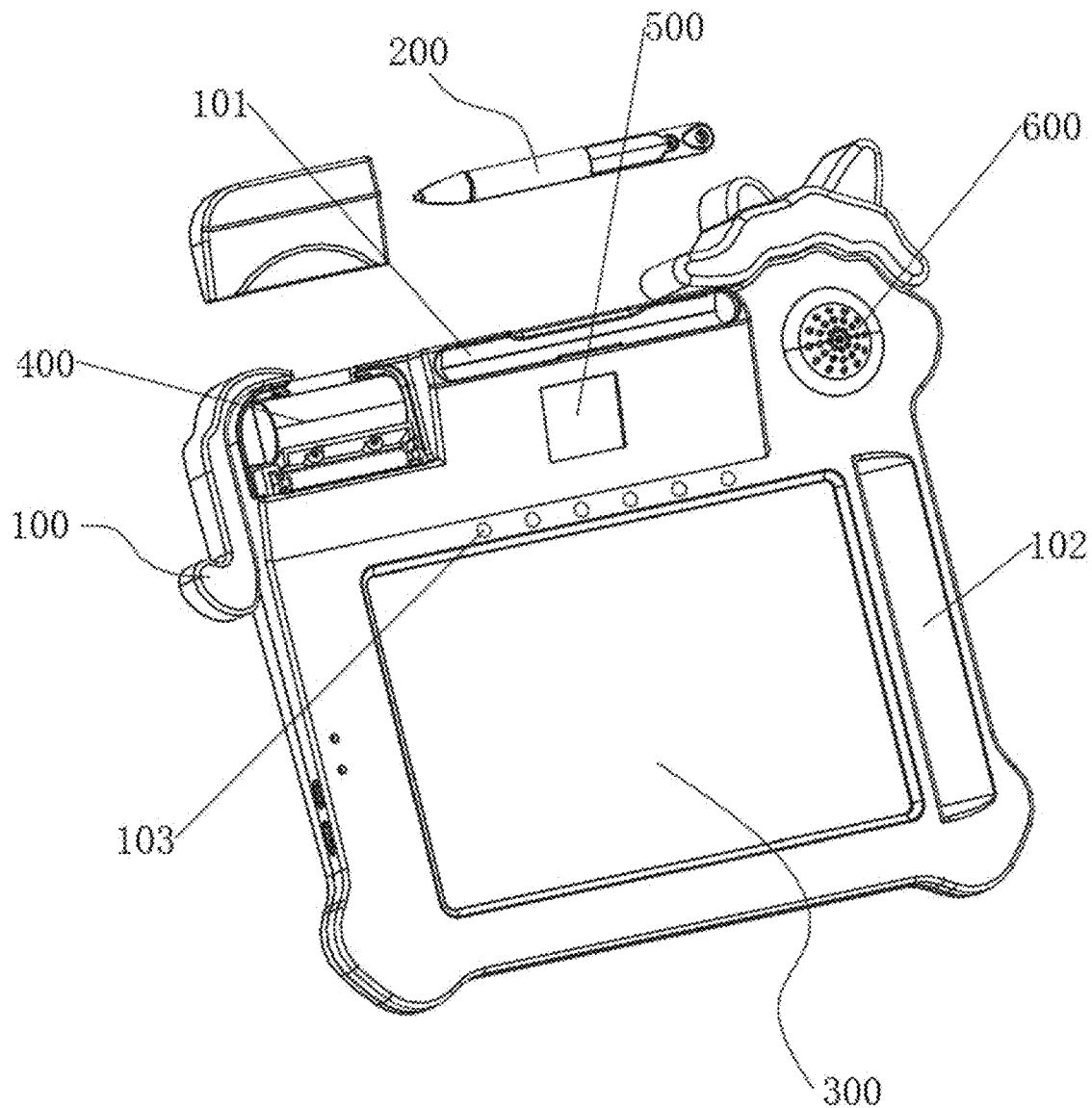
FIG. 3 is an explosive view of the present invention.
Figure 4:
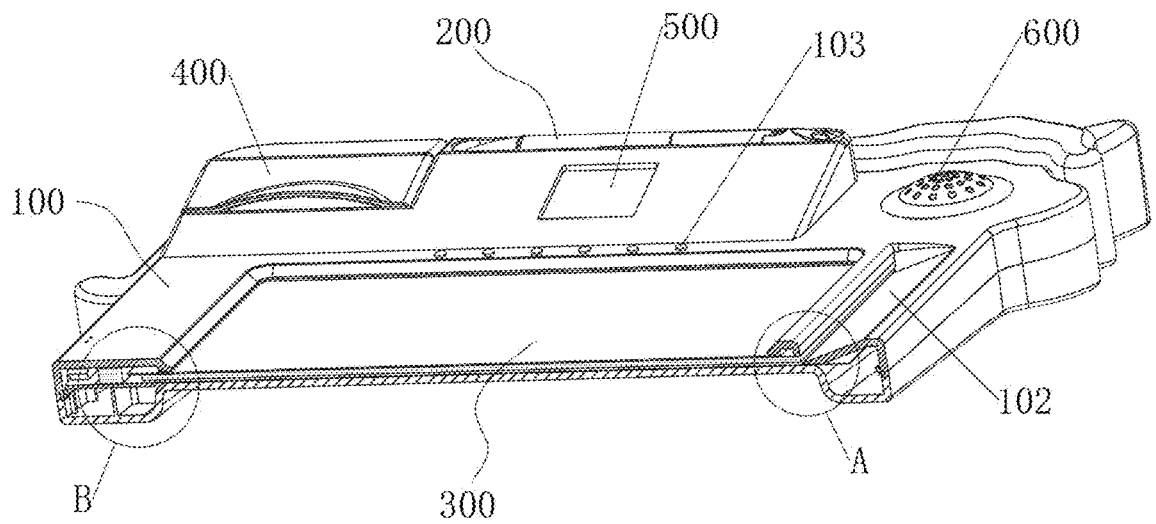
FIG. 4 is a section view of the present invention.

Refer to FIGS. 1-3. It is necessary to further clarify that in this embodiment, the printing mechanism 400 is located in the upper left corner of the handwriting pad 100. When the handwriting pad 100 is placed on a desktop, the position of the printing mechanism 400 needs to be considered such that users are allowed to write and collect printed paper at the same time. Additionally, the printing mechanism 400 is capable of both black and white printing and color printing, and accurately reproducing the color levels and details of images, thus providing users with a more enriched and vivid visual experience.

In this embodiment, the handwriting pad 100 is also provided with a control button group 103 coplanar with the display panel 300, and the control button group 103 is electrically connected with the control component. By arranging the control button group 103 and the handwriting pad 100 in a coplanar manner, users can enjoy greater convenience and comfort in use. Users can easily reach these control buttons, allowing instant adjustment of settings or execution of commands without interrupting the writing or drawing process, thus improving the user operation experience.

In this embodiment, the control button group 103 is composed of a plurality of mechanical buttons or touch buttons, and the buttons have the functions of stroke thickness adjustment, formatting, sharing, photographing, selecting up, selecting down, printing, saving, erasing, clearing, calling, recording and color adjustment.

Here, the stroke thickness adjustment button allows users to easily adjust the thickness of lines according to the needs of creation or writing; the formatting button provides users with a quick way to organize documents or drawings, restoring them to a neat initial state with a single click; the sharing button allows users to share their works or notes with friends or on social media instantly; the up and down selecting buttons make it easy for users to quickly flip through documents or menus; the printing and saving buttons respectively meet users' needs to output written works in physical or digital formats; the recording button allows for recording on the handwriting device; and the color adjustment button allows users to select the desired color when writing or drawing, and also enables choosing between black and white or color printing.

The erasing and clearing buttons enable users to make flexible modification, allowing for partial deletion and adjustment or complete clearing. Specifically, to print the trajectory information, that is, when the printing operation needs to be performed, pressing the printing button will prompt the control component to control the printing mechanism 400 to print the trajectory information on paper. Of course, this can also be achieved by setting a predetermined program. For example, when the trajectory information is formed and the trajectory information is not updated after a first predetermined time, the control component performs the printing operation without the need for manual intervention. To erase the moving trajectory of the display panel 300, that is, when the erasing operation needs to be performed, pressing the erasing button will prompt the control component to apply an erasing voltage to the display panel 300 to reset the display panel 300, that is, erase the trajectory on the display panel 300. Of course, this can also be achieved by setting a predetermined program. For example, when the trajectory information is formed and the trajectory information is not updated after a second predetermined time, the erasing operation is performed. To clear the trajectory information, that is, when the clearing operation needs to be performed, pressing the clearing button will prompt the control component to clear the trajectory information. Of course, this can also be achieved by setting a predetermined program. For example, when the trajectory information is formed and the trajectory information is not updated after a third predetermined time, the clearing operation is performed.

Specifically, the control component clears the trajectory information when applying the erasing voltage. The control component deletes the trajectory information while erasing the moving trajectory displayed on the display panel 300. In this way, the moving trajectory displayed on the display panel 300 has a corresponding relationship with the trajectory information. By observing the moving trajectory displayed on the display panel 300, the printed content can be known, and what you see is what you get, thus improving the use experience. In specific implementation, the erasing button and the clearing button can be one button.

Moreover, in this embodiment, the control component can acquire the trajectory information from the electromagnetic induction antenna board 700 and save it as backup information, and the control component can control the printing mechanism 400 to print the trajectory information on paper.

Based on this, before the erasing operation, the trajectory information can be saved as backup information, so that after the erasing operation, the previous trajectory information can till be printed on paper.

It should be noted here that when the trajectory information is saved as backup information, that is, when the saving operation is needed, the control component can be equipped with a mechanical saving button to save the trajectory information as backup information, that is, when the saving button is pressed, the control component saves the trajectory information as backup information. Of course, a corresponding touch button may be set, and a predetermined program may be set to realize this. For example, when the trajectory information is formed and the trajectory information is not updated after a first predetermined time, the control component performs the saving operation without the need for manual intervention.

It should also be noted here that the trajectory information has a corresponding relationship with the moving trajectory of the display panel 300, there may be a plurality of pieces of backup information which are usually different, and the backup information has a corresponding relationship with the moving trajectory of the display panel 300 only when it is saved. For the saving of the backup information, the control component can be used for direct saving, or an interface 105 may be set. Here, the interface 105 is a type-c port, and the interface 105 can be plugged with a data cable, so that the information can be transmitted to a mobile storage device for storage through the data cable, such as a USB flash disk and a mobile hard disk.

Figure 5:
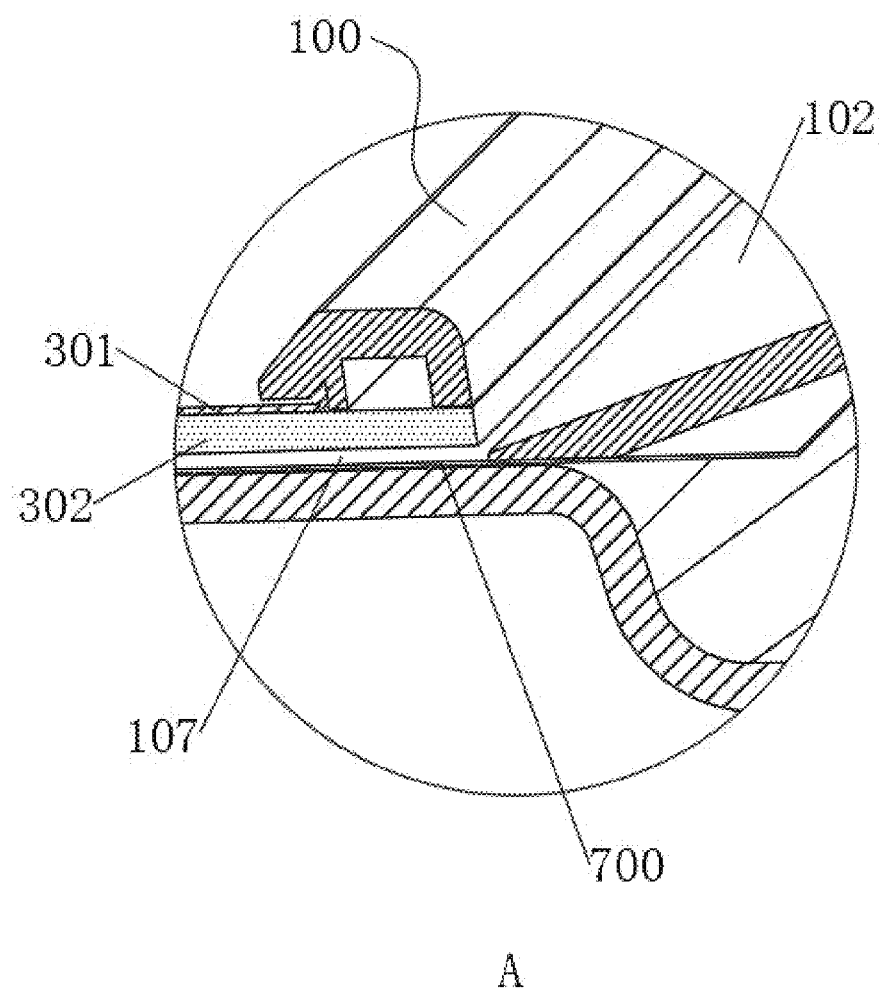
FIG. 5 is a partially enlarged view of part A in FIG. 4.
Figure 6:
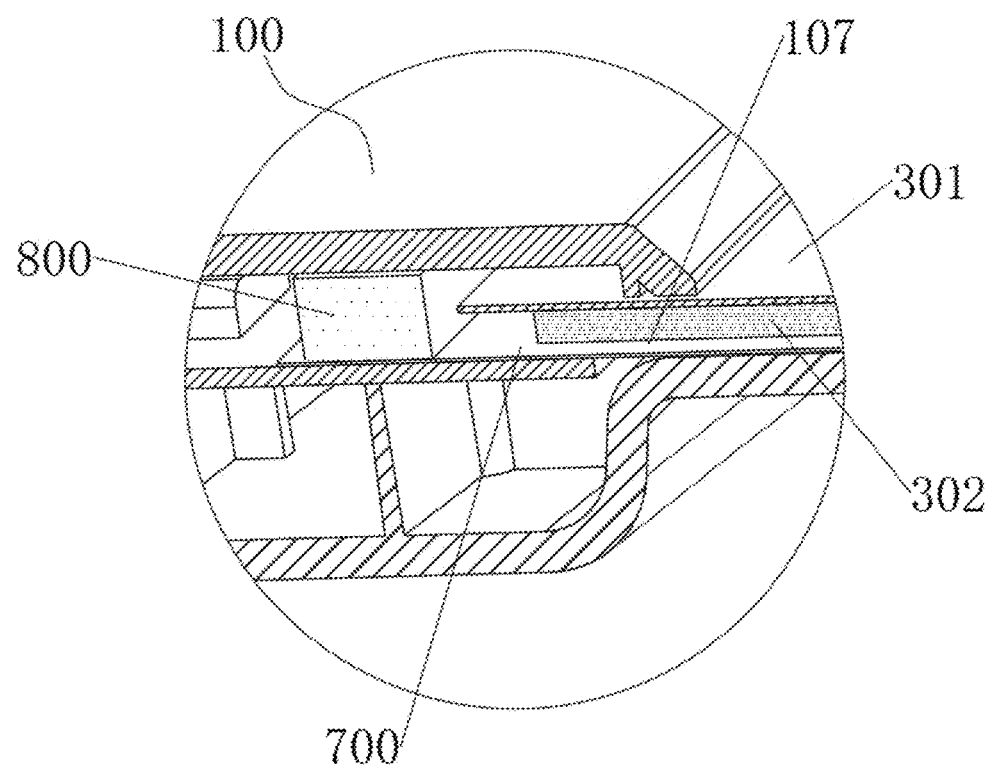
FIG. 6 is a partially enlarged view of part B in FIG. 4.
Figure 7:
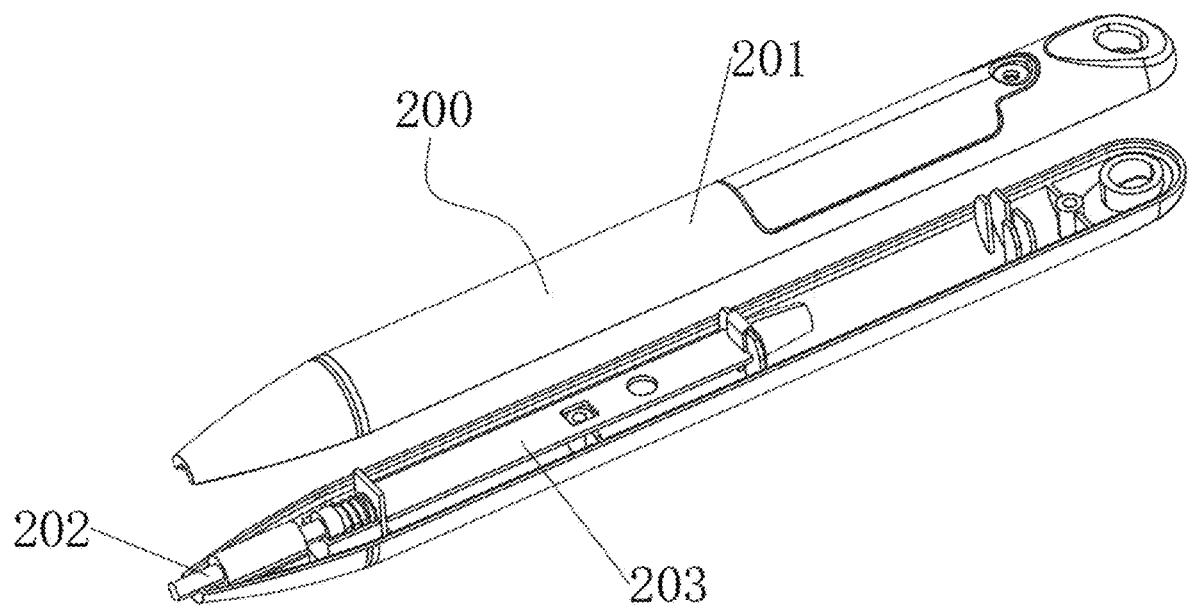
FIG. 7 is a structural diagram of an electromagnetic pen according to the present invention.

Refer to FIGS. 5-6. In this embodiment, the display panel 300 is a semitransparent display panel 300. The display panel 300 is spaced apart from the electromagnetic induction antenna board 700, and an imitation chamber 107 is formed. The imitation chamber 107 is provided with an insertion port 102 formed at a side of the handwriting pad 100. Specifically, in this embodiment, the insertion port 102 is located at a right end of the handwriting pad 100.

Based on this, it can be used together with a tracing film printed with graphics or characters. Specifically, in the use process, the tracing film printed with graphics or characters is put into the imitation chamber 107 through the insertion port 102, and users can observe the graphics and characters on the tracing film through the display panel 300 for imitation.

From the above, it can be seen that based on this structural design, the handwriting electronic device with printing and various other functions also provides the imitation function, further diversifying its usage and enabling users to imitate handwriting. This diversified user experience effectively avoids monotony and increases user interest.

Specifically, a distance between the display panel 300 and the electromagnetic induction antenna board 700 is 0.2-1.2 mm. The distance allows the imitation chamber 107 to receive a tracing film with a certain thickness, thus expanding the material selection range of the tracing film, reducing the accessory cost of the display panel 300, and also reducing the use cost of the handwriting electronic device with printing and various other functions. Further, the distance also ensures that the electromagnetic pen 200 has good electromagnetic induction with the electromagnetic induction antenna board 700 during writing.

Refer to FIGS. 5-6. In this embodiment, the display panel 300 comprises a semitransparent display film 301 and a transparent support plate 302, which are arranged with one above the other.

Here, in this embodiment, the support plate 302 can be made of an acrylic plate. The display film 301 is preferably a semitransparent nematic allyltributylstannane liquid crystal display film or a cholesteric liquid crystal display film. In other embodiments, the display film 301 may also be a semitransparent cholesteric liquid crystal display film or other nematic liquid crystal display films.

Because the display panel 300 is spaced apart from the electromagnetic induction antenna board 700, the display panel 300 itself needs to have certain mechanical strength, and based on this, the overall mechanical strength of the display panel 300 can be controlled by the thickness of the support plate 302, thus realizing a simple structure and low cost.

In this embodiment, the handwriting pad 100 further comprises at least one luminous body 800, each luminous body 800 is electrically connected with the control component and is arranged at a peripheral side of the support plate 302, and each luminous body 800 is used for irradiating the support plate 302 and directing the light into the imitation chamber 107.

Because the display panel 300 is semitransparent, the light reaching the tracing film is reduced, and the tracing film will appear dark and difficult to see when viewed through the display panel 300.

In this embodiment, the luminous body 800 is an LED lamp. Based on this structural design, the light emitted by the luminous body 800 is guided through the structure of the support plate 302 to ensure that the light uniformly and efficiently irradiates the inside of the imitation chamber 107, significantly enhancing the illumination intensity on the tracing film. In this way, when the light passes through the display panel 300, light loss can be reduced and light distribution can be optimized, thus avoiding the problem that the tracing film looks dark due to insufficient light. Therefore, users can practice imitation under brighter and clearer visual conditions.

In addition, the structural design also enhances the environmental adaptability of the handwriting device. Even in the environment with bad lighting conditions or no natural light at all, the device can still maintain a stable working state through the supplementary lighting of the built-in light source, ensuring that users can write and work in any dim environment.

In this embodiment (not shown in the figure), the control component may also comprise a wireless connection module, which supports wireless communication technology and can seamlessly connect and exchange data with external devices. Through the wireless connection module, the control component can receive external information from external devices in real time and accurately, ensuring the integrity and timeliness of the information.

Further, a precise logic processing unit may be arranged inside the control component, which is responsible for analyzing the received external information and accurately controlling the printing mechanism 400 connected therewith according to preset instructions or program logic. This process not only realizes the rapid processing and conversion of information, but also ensures the efficient execution of printing tasks. Finally, the control component accurately controls the operation of the printing mechanism 400, ensuring the precise and error-free printing of the processed external information onto paper, thereby completing the entire process from information acquisition to physical output.

In this way, the handwriting electronic device with printing and various other functions can be flexibly interconnected with various external smart devices, such as smart phones, tablet computers and notebook computers, through the wireless connection module. In addition, through the seamless integration of the wireless connection module, the function of the printing mechanism 400 is significantly enhanced, and it is no longer limited to simply converting the content written by the electromagnetic pen 200 into paper documents. On the contrary, it can process and print a variety of information from external devices, including but not limited to documents, pictures, web pages and even dynamically generated graphics and charts, which greatly enriches the diversity and practicality of printed content, while also further increasing the variety of usage, effectively maintaining users' sense of novelty and interest.

It should be noted here that when the handwriting electronic device with printing and various other functions is connected to external devices through the wireless connection module, the core operation functions such as printing, erasing and saving are all triggered and executed remotely through the external smart devices, which greatly improves the convenience and flexibility of operations. Specifically, users can download and install a matching APP specially designed for the handwriting device on their smart phones, and use this APP as a remote control center to easily realize diversified operations such as one-click printing, instant erasing, and secure saving. Moreover, the APP may also have intelligent identification and custom setting functions to ensure that users can flexibly adjust printing parameters, preview the erasing effect and manage saved files according to their own needs, so as to realize efficient and accurate information processing and output. With this innovative design, users are no longer limited by traditional physical buttons, allowing them to remotely control the handwriting device through a mobile APP, providing a more intelligent and convenient user experience. Additionally, this opens up broader opportunities and potential for the application of handwriting devices in areas such as mobile office and education.

In this embodiment, the handwriting pad 100 further comprises a speaker 600, and the speaker 600 is electrically connected with the control component. Based on this, the speaker 600 can provide audio announcements for relevant information, such as indicating low battery, or informing about the status of an operation.

In addition, in this embodiment, the control component can identify the content of the trajectory information. Based on this, learning activities can be carried out by means of the speaker 600 and external devices. More specifically, users can practice exercises by writing answers with the electromagnetic pen 200 on the handwriting pad 100. The control component recognizes the content and provides corresponding announcements based on the accuracy of the content.

This further enhances the diversity of usage and increases users' enjoyment, making it less likely for them to lose interest In this embodiment, the handwriting pad 100 also comprises a camera (not shown in the figure), which can be movably arranged on the handwriting pad 100. When the camera is used, the camera can rise upward and take pictures of the display panel 300. Specifically, the camera is connected with the control component through a stable electrical interface 105, the control component receives and processes image data from the camera, and at the same time, the control component controls the printing mechanism 400. Then, by means of preset algorithm optimization, the control component can convert complex image information into printing instructions, and drive the printing mechanism 400 to print on paper, thus realizing the seamless connection from photographing to printing. By incorporating the photo capture and printing functions into the handwriting device, it significantly enriches the usage scenarios of the handwriting pad 100, meeting users' needs in diverse situations. This feature also improves the overall user experience, enhances interactivity and fun, and helps to sustain user interest.

Refer to FIG. 3. In this embodiment, the handwriting pad 100 is provided with a pen slot 101 for placing the electromagnetic pen 200, so as to facilitate the storage of the electromagnetic pen 200. In one embodiment, as shown in FIGS. 1-4, the pen slot 101 is formed in an upper surface of the handwriting pad 100, which makes it more convenient to remove and place the electromagnetic pen 200 when the handwriting device is used. In another embodiment, the pen slot 101 is formed in a right side of the handwriting pad, which reduces the occupancy of the working surface of the handwriting pad 100, ensuring its cleanliness and spaciousness.

Refer to FIG. 2. In this embodiment, the handwriting pad 100 further comprises a rechargeable battery. The rechargeable battery is electrically connected with the standardized Type-C interface 105 and the advanced control component with high efficiency and stability through a highly integrated electronic circuit. The Type-C interface 105, as the current industry standard, ensures widespread compatibility of charging cables and simplifies the charging process, lowering the user's barrier to use. During the charging process, the control component intelligently monitors the status of the battery to ensure safe and efficient charging, effectively extending the lifespan of the battery.

Refer to FIGS. 1 and 2. In this embodiment, the handwriting pad 100 further comprises an indicator lamp 104 and a switch 106, both of which are electrically connected with the control component. As a key component for device status monitoring, the indicator lamp 104 adopts advanced LED technology, so as to provide accurate and clear real-time feedback on the working status of the handwriting pad 100 through color changes and specific flashing patterns, including charging status, working mode, and battery information, offering professional users intuitive and detailed status indication. The switch 106 is used to start the control component, and users can easily control the start and stop of the control component with simple pressing actions, enabling quick response and precise control of the overall functionality of the handwriting pad 100.

In other implementation modes of the present invention, a wireless voice communication module (not shown in the figure) may also be arranged in the handwriting pad 100, and the voice communication module integrates wireless communication technology and voice processing technology, bringing voice interaction experience to users.

In other implementation modes of the present invention (not shown in the figure), an upper surface of the handwriting pad 100 may also be provided with a voice calculator. By providing the voice calculator, users can perform digital calculation, which further expands the functions of the handwriting device, enabling it to be suitable for more scenarios.

The wireless voice communication module can support a variety of wireless communication protocols, including but not limited to Wi-Fi, Bluetooth, etc., ensuring wide compatibility with most mobile devices with wireless communication functions in the market (such as smart phones, tablet computers, children's smart watches, etc.). By ensuring that the mobile device has the appropriate wireless communication function activated, users can easily establish a seamless connection between the handwriting pad 100 and the mobile device through a simple pairing or connection process. During wireless communication, the wireless communication function can be enabled or disabled by operating a communication button on the handwriting pad 100.

The wireless voice communication module may also have a built-in microphone with high sensitivity, and the wireless voice communication module is electrically connected with the speaker 600, thus ensuring high-quality voice input and output. Both the user's handwriting pad 100 and the mobile device can enjoy a clear and smooth voice call effect. Further, the wireless voice communication module also supports noise suppression and echo cancellation technology, so as to effectively reduce background noise and echo interference and improve the call quality even in a noisy environment.

In addition, the wireless voice communication module may also have an intelligent voice control function. Users can control some operations of the handwriting pad 100 through voice commands, such as initiating calls, ending phone calls, and adjusting volume, so as to achieve more convenient human-computer interaction.

In this embodiment, as shown in FIGS. 1-4 and FIG. 8, the handwriting pad 100 further comprises at least one LCD screen 500 for displaying the status of the handwriting device, and the LCD screen 500 is electrically connected with the control component.

Preferably, the LCD screen 500 is a 2.8 inch color display screen. Of course, in other implementation modes, the size of the LCD screen 500 is not limited to 2.8 inches, but may also be any other size suitable for installation on the handwriting device.

Here, the LCD screen 500 is electrically connected with the control component and there is a data transmission protocol, enabling the LCD screen 500 to present various key status parameters of the handwriting device. These parameters include, but are not limited to, the percentage of remaining battery power, the current working mode of the device (such as standby, charging, in use), the use of internal memory and the remaining space. Through intuitive icons, numbers or graphical interfaces, users can quickly obtain the required information and have a comprehensive understanding of the overall status of the device.

In another implementation mode of this embodiment (not shown in the figure), a large number of pictures (such as pictures of landscapes, fruits and vegetables, buildings, etc.) may also be stored in the control component in advance. The stored pictures can be displayed on the LCD screen 500 by means of the control button group 103. Subsequently, users can engage in drawing based on the displayed images, thus enabling another form of imitation function. Additionally, when imitating a picture, what users draw can be transmitted to the control component for comparison to assess the accuracy of the drawing. The comparison results can be played through the speaker 600 to notify users.

Embodiment 2

Figure 9:
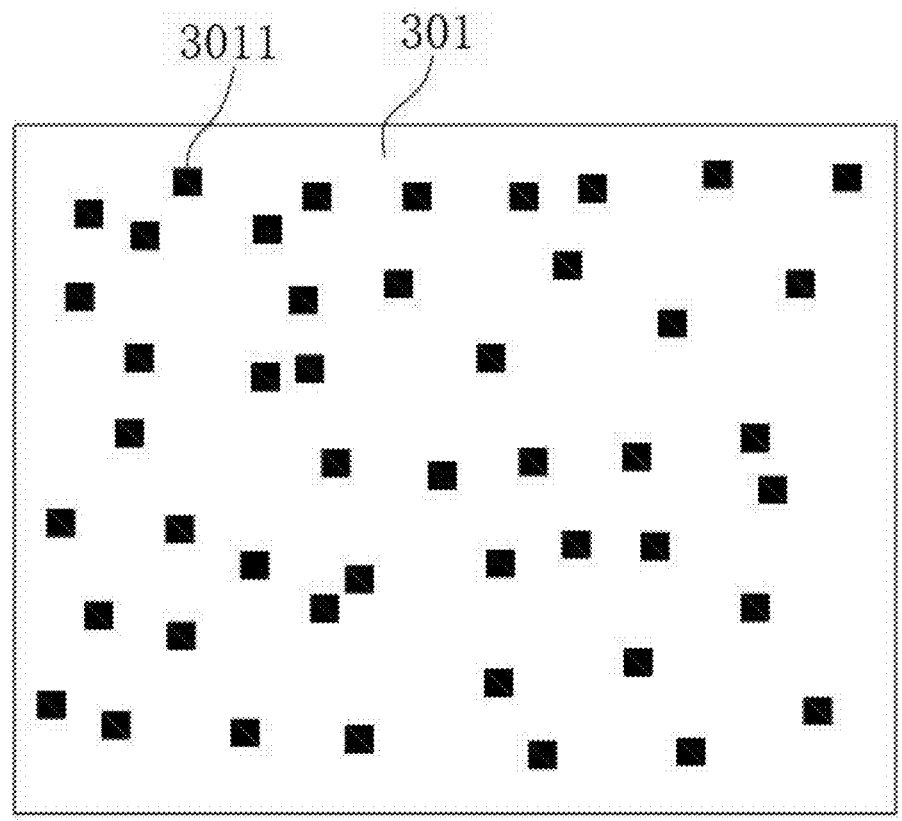
FIG. 9 is a structural diagram of a display film according to another embodiment of the present invention.
Figure 10:
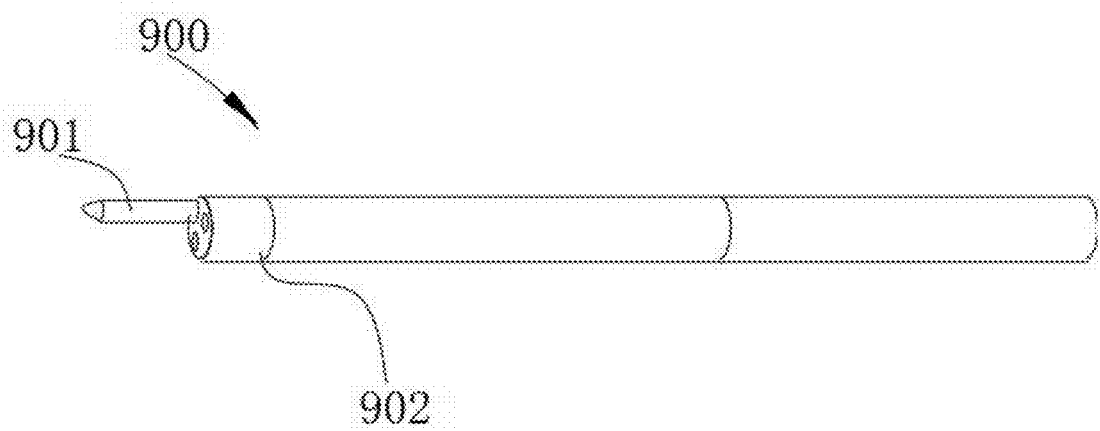
FIG. 10 is a structural diagram of a smart pen according to the present invention.
Figure 11:
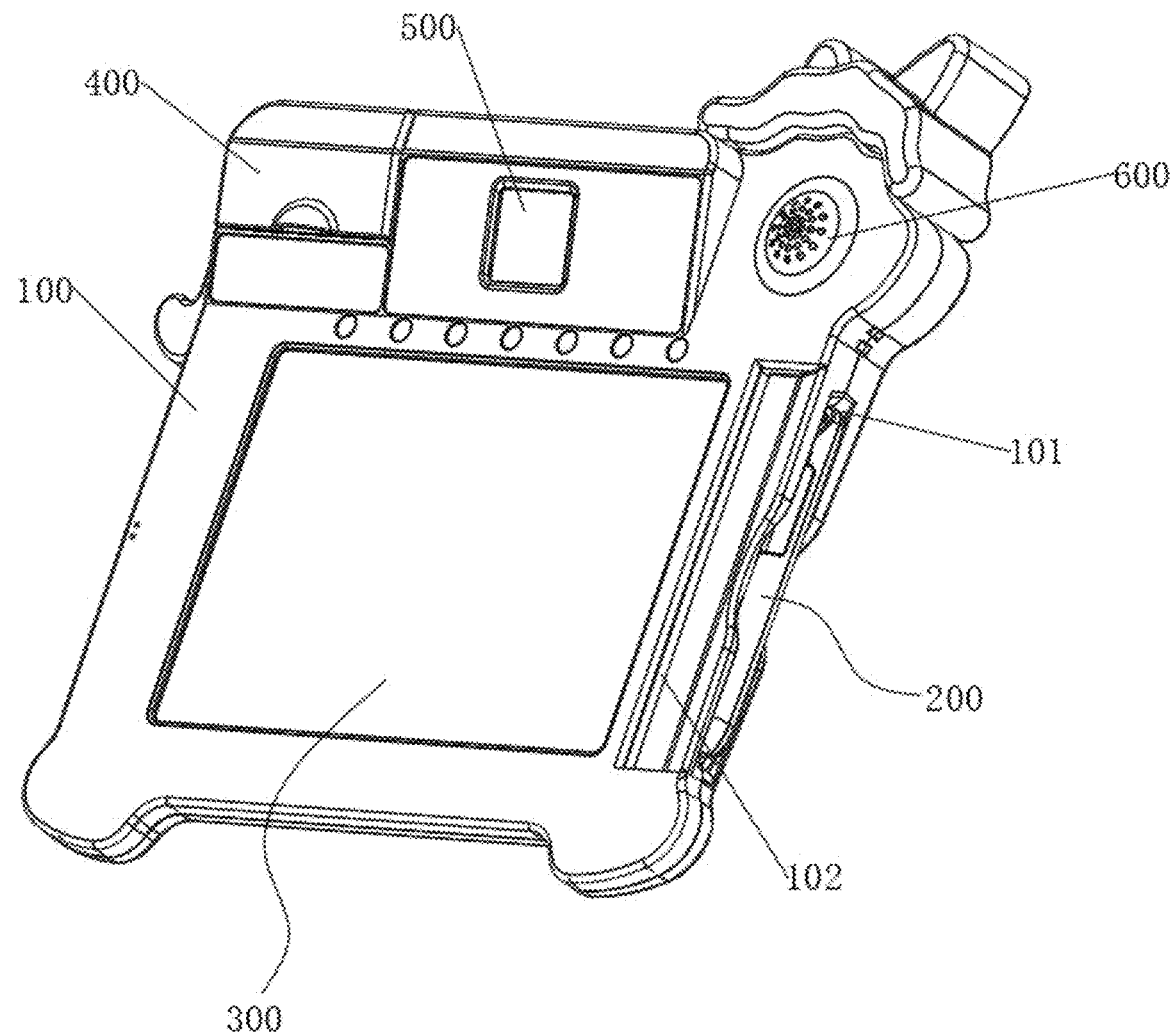
FIG. 11 is a structural diagram of a pen slot according to another embodiment of the present invention.

Refer to FIGS. 8 and 9.

Embodiment 2 is different from Embodiment 1 in that: a handwriting electronic device with printing and various other functions comprises a smart pen 900 and a handwriting pad 100. The smart pen 900 is used for writing on the handwriting pad 100, and the handwriting pad 100 comprises at least a display panel 300, a printing mechanism 400 and a control component. The display panel 300 comprises a semitransparent display film 301. A surface of the display film 301 not in contact with the smart pen 900 is provided with an array of code points 3011. The smart pen 900 comprises an optical sensing module 902 for detecting a moving trajectory of the smart pen 900, and a processing unit for processing the moving trajectory of the smart pen 900. The display panel 300 is used to display the moving trajectory of the smart pen 900 in the writing process. The control component can obtain the trajectory information from the processing unit and control the printing mechanism 400 to print the trajectory information on paper.

In this embodiment, the processing unit and the control component are connected by wireless signals, and the code points 3011 are printed on the back of the display film 301 in an array, while the front of the display film 301 is in direct contact with an inductive pen point 901 of the smart pen 900. In other implementation modes (not shown in the figure), the code points 3011 may also be encapsulated in the display film 301 by microencapsulation and form an array.

According to the above, the smart pen 900 can write on the semitransparent color display film 301, while continuously acquiring the information of the code points 3011 at positions corresponding to the inductive pen point 901 in the writing process, and performing logical processing according to the information of the code points 3011 to obtain the writing trajectory.

Specifically, a pressure sensor is connected with the inductive pen point 901 and used to detect whether the inductive pen point 901 is in a writing state, the optical sensing module 902 is used to obtain the information of the code points 3011 that the inductive pen point 901 passes when writing on the display film 301, and the processing unit generates the writing trajectory of the inductive pen point 901 according to the information of the code points 3011. Here, through the pressure sensor, whether the smart pen 900 is writing or not can be accurately determined, and the optical sensing module 902 is prevented from misrecognition.

Moreover, in this embodiment, the array of code points 3011 is arranged on the back of the display film 301, so as to be printed by a printing process. This design not only simplifies the production process, but also effectively reduces the manufacturing cost. Moreover, because the array of code points 3011 is arranged on the back of the display film 301, the smart pen 900 will not damage the array of code points 3011 in the writing process, so that the display film 301 can be reused, thereby significantly reducing the use cost.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A handwriting electronic device with printing and various other functions, comprising an electromagnetic pen and a handwriting pad, wherein the electromagnetic pen is used for writing on the handwriting pad;

the handwriting pad comprises at least one display panel, an electromagnetic induction antenna board, a printing mechanism and a control component, the at least one display panel is spaced apart from the electromagnetic induction antenna board, and an imitation chamber is formed; the display panel, the electromagnetic induction antenna board and the printing mechanism are all electrically connected with the control component, the display panel is used to display a moving trajectory of the electromagnetic pen in the writing process, and the electromagnetic induction antenna board is used to detect the moving trajectory of the electromagnetic pen in the writing process; and the control component is able to acquire trajectory information from the electromagnetic induction antenna board and control the printing mechanism to print the trajectory information on paper, and the control component is able to apply an erasing voltage to the display panel, and clear the trajectory information, wherein the control component clears the trajectory information when applying the erasing voltage, the at least one display panel is a semitransparent nematic allyltributylstannane liquid crystal display panel or a cholesteric liquid crystal display panel, a side of the imitation chamber is provided with an insertion port located at a side of the handwriting pad, and a distance between the display panel and the electromagnetic induction antenna board is 0.2-1.2 mm.

2. The handwriting electronic device with printing and various other functions according to claim 1, wherein the display panel comprises a semitransparent display film and a transparent support plate, the display film is a nematic allyltributylstannane liquid crystal display film or a cholesteric liquid crystal display film, and the display film and the support plate are arranged with one above the other.

3. The handwriting electronic device with printing and various other functions according to claim 2, wherein the handwriting pad further comprises at least one luminous body, each luminous body is electrically connected with the control component and is arranged at a peripheral side of the support plate, and each luminous body is used for irradiating the support plate and directing the light into the imitation chamber.

4. The handwriting electronic device with printing and various other functions according to claim 1, wherein the control component is able to acquire the trajectory information from the electromagnetic induction antenna board and save it as backup information, and the control component is able to control the printing mechanism to print the trajectory information on paper.

5. The handwriting electronic device with printing and various other functions according to claim 1, wherein the control component comprises a wireless connection module capable of being wirelessly connected with an external device, and is able to acquire external information from the external device through the wireless connection module and control the printing mechanism to print the external information on paper.

6. The handwriting electronic device with printing and various other functions according to claim 1, wherein the handwriting pad further comprises a speaker, and the speaker is electrically connected with the control component; and/or the control component is able to identify the content of the trajectory information.

7. The handwriting electronic device with printing and various other functions according to claim 1, wherein the handwriting pad also comprises a camera, and the camera is electrically connected with the control component and is able to acquire image information by taking photos; the control component is able to control the printing mechanism to print the image information on paper; and the handwriting pad also comprises at least one LCD screen for displaying the status of the handwriting device, and the LCD screen is electrically connected with the control component.

8. A handwriting electronic device with printing and various other functions, comprising a smart pen and a handwriting pad, wherein the smart pen is used for writing on the handwriting pad;

the handwriting pad comprises at least a display panel, a printing mechanism and a control component;

the display panel comprises a semitransparent display film, and a surface of the display film not in contact with the smart pen is provided with an array of code points;

the smart pen comprises an optical sensing module for detecting a moving trajectory of the smart pen, and a processing unit for processing the moving trajectory of the smart pen; and the display panel is used to display the moving trajectory of the smart pen in the writing process, and the control component is able to obtain the trajectory information from the processing unit and control the printing mechanism to print the trajectory information on paper wherein the control component clears the trajectory information when applying the erasing voltage, the at least one display panel is a semitransparent nematic allyltributylstannane liquid crystal display panel or a cholesteric liquid crystal display panel, a side of the imitation chamber is provided with an insertion port located at a side of the handwriting pad, and a distance between the display panel and the electromagnetic induction antenna board is 0.2-1.2 mm.

9. The handwriting electronic device with printing and various other functions according to claim 8, wherein the smart pen also comprises an inductive pen point and a pressure sensor, the pressure sensor is connected with the inductive pen point, and the display film is a nematic allyltributylstannane liquid crystal display film or a cholesteric liquid crystal display film.

\* \* \* \* \*